(12) United States Patent
Dipple et al.

(10) Patent No.: US 12,416,721 B1
(45) Date of Patent: Sep. 16, 2025

(54) MODULAR MULTI-ANGLE SYNTHETIC APERTURE RADAR SENSOR ON A TRACK

(71) Applicants: National Technology & Engineering Solutions of Sandia, LLC, Albuquerque, NM (US); Government of the United States, as represented by the Secretary of the Air Force, Wright-Patterson AFB, OH (US)

(72) Inventors: Kathleen Dipple, Fort Walton Beach, FL (US); Roger Derek West, Albuquerque, NM (US)

(73) Assignees: National Technology & Engineering Solutions of Sandia, LLC, Albuquerque, NM (US); Government of the United States, as represented by the Secretary of the Air Force

( * ) Notice: Subject to any disclaimer, the term of this patent is extended or adjusted under 35 U.S.C. 154(b) by 261 days.

(21) Appl. No.: 18/105,020

(22) Filed: Feb. 2, 2023

Related U.S. Application Data

(60) Provisional application No. 63/312,412, filed on Feb. 22, 2022.

(51) Int. Cl.
*G01S 13/90* (2006.01)
*F16M 11/12* (2006.01)
(Continued)

(52) U.S. Cl.
CPC ....... *G01S 13/9005* (2013.01); *F16M 11/123* (2013.01); *G01S 13/862* (2013.01);
(Continued)

(58) Field of Classification Search
CPC .............. G01S 13/9005; G01S 13/895; G01S 13/9043; G01S 13/862; G01S 13/9023;
(Continued)

(56) References Cited

U.S. PATENT DOCUMENTS

2018/0224541 A1* 8/2018 Pieraccini ........... G01S 13/9023
2021/0389257 A1* 12/2021 Liu .................. G01N 23/20008

OTHER PUBLICATIONS

Chang, W. et al., "A Novel Multi-Angle SAR Imaging System and Method Based on an Ultrahigh Speed Platform," Sensors (2019) 19:1701, 17 pages.
(Continued)

*Primary Examiner* — Vladimir Magloire
*Assistant Examiner* — Nazra Nur Waheed
(74) *Attorney, Agent, or Firm* — Mark A. Dodd; Merle W. Richman

(57) ABSTRACT

A synthetic aperture radar sensor having five degrees of freedom (DoF) is disclosed. The five DoF enable multiple imaging operations, including multiple simultaneous imaging operations. The sensor includes multiple transceivers mounted to track segments, with variable spacing between the transceivers being the first DoF. The second DoF is about a vertical axis allowing side-to-side motion of the transceivers. The third DoF is about a horizontal axis parallel to a direction of travel with the segments perpendicular to the direction of travel, thereby allowing the transceivers to form a horizontal line, a vertical line, or some intervening angle. The transceivers can be at different angles, corresponding to the fourth DoF, which permits simultaneous vertical and side-looking operation. The fifth degree of freedom is about a horizontal axis parallel to the direction of travel with the segments parallel to the direction of travel, allowing pointing of the transceivers at a desired scene.

12 Claims, 3 Drawing Sheets

(51) Int. Cl.
  *G01S 13/86*  (2006.01)
  *G01S 13/89*  (2006.01)
  *G01S 13/02*  (2006.01)

(52) U.S. Cl.
  CPC ........ *G01S 13/895* (2019.05); *G01S 13/9023* (2013.01); *G01S 13/9029* (2013.01); *G01S 13/9043* (2019.05); *G01S 2013/0245* (2013.01)

(58) Field of Classification Search
  CPC ........ G01S 13/9029; G01S 2013/0245; F16M 11/123
  See application file for complete search history.

(56) References Cited

OTHER PUBLICATIONS

Egido, A. et al., "Fully Focused SAR Altimetry: Theory and Applications," IEEE Transactions on Geoscience and Remote Sensing (2017) 55(1):392-406.

Zhuravlev, A. et al., "Experimental Simulation of Multi-Static Radar with a Pair of Separated Movable Antennas," EEE International Conference on Microwaves, Communications, Antennas and Electronic Systems (COMCAS 2015) Nov. 2-4, Tel Aviv, Israel, 5 pages.

\* cited by examiner

MODULAR MULTI-ANGLE SYNTHETIC APERTURE RADAR SENSOR ON A TRACK

RELATED APPLICATIONS

This application claims priority to U.S. Provisional Application No. 63/312,412, filed on Feb. 22, 2022, and entitled MODULAR MULTI-ANGLE SYNTHETIC APERTURE RADAR SENSOR ON A TRACK, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a modular, multi-angle synthetic aperture radar (SAR) sensor on a multi-segment track, which may be used, for example, for highly accurate aerial navigation.

BACKGROUND

Synthetic Aperture Radar (SAR) sensing offers several advantages over optical sensing. For example, SAR sensors may operate during both day and night and under all types of weather conditions. For these reasons, SAR has been applied to topographic mapping, navigation, environmental monitoring, and information acquisition. One drawback of SAR sensing is that electromagnetic scattering, especially for complex objects, may be a strong function of the angle of incidence of the SAR beam. For applications that need to be independent of the angle of incidence, so called omnidirectional sensing applications, multi-angle SAR sensors hold much promise.

Because electromagnetic scattering properties vary with the angle of incidence, SAR sensing may be greatly affected by the angle of incidence. When a scene is observed by a SAR sensor from only a single angle, if the objects in the scene are occluded or the scattering coefficients at that angle are low, then the resultant information is incomplete. In contrast, because a multi-angle SAR sensor observes the scene from multiple angles of incidence, it will obtain far more information about the scene.

Current multi-angle SAR sensors may be implemented in several ways, including spotlight (e.g., beam steering), wide azimuth beam, and multiple flight path SAR. Recently, Chang demonstrated the ability to generate simultaneous, multi-angle (side, forward, and back looking) SAR sensing using digital multi-beam forming. See W. Chang et al. "A Novel Multi-Angle SAR Imaging System and Method Based on an Ultrahigh Speed Platform," Sensors, vol. 19, art. no. 1701 (2019), the contents of which are incorporated herein by reference. Chang, and other electronic beam steering approaches, require very complex hardware and software, typically resulting in a very high overall system cost. Further, there are limits on how effectively the beam can be steered in these electronic beam steering systems.

In a spotlight SAR sensor, the antenna is steered to increase the observation time and to observe a scene from multiple aspect angles. Using this mode, the azimuth bandwidth of the signal may be greater than the pulse repetition frequency (PRF), which causes spectrum ambiguity. This spectrum ambiguity complicates the required signal processing. While spotlight SAR expands the observation angle, it also reduces the imaging footprint on the ground, and thus will miss objects outside of the imaging footprint. For example, when using a high speed platform, the azimuth bandwidth of the signal becomes large, and thus a high PRF is required.

In a wide azimuth beam SAR sensor, the beam width is large, resulting in echoes of objects within a scene from different aspect angles. While the wide beam SAR increases the imaging angle, the resultant two-dimensional (2D) spectrum is a sector. This causes increased range cell migration (RCM) and severe coupling of the range and azimuth information. The error caused by RCM compensation processing in the frequency domain affects the imaging accuracy. While a back projection algorithm can compensate for RCM in the time domain, it is computationally intensive.

At least one other multi-angle SAR sensor approach requires multiple flight paths. While a large imaging scope can be achieved, the flight efficiency is low, the relative cost is high, and multiple flight paths may not be feasible for some applications.

Another alternative is a multiple phase center SAR sensor. A multiple phase center SAR employs multiple antennas. However, multiple phase center SAR sensors typically have fixed phase center positions, which cannot simultaneously be used in both the desired vertical and side-looking SAR modes.

Thus, the need exists for a SAR sensor that does not suffer from the limitations of traditional multi-angle or multiple phase center SAR sensors.

SUMMARY

One aspect of the present invention relates to a SAR sensor having five degrees of freedom. The five degrees of freedom enable multiple imaging operations, including, in some configurations, multiple imaging operations simultaneously. The SAR sensor itself has multiple transceivers, with corresponding antennas, with the transceivers mounted to one or more track segments. The ability to change the spacing between the transceivers on the track segments corresponds to the first degree of freedom. The remaining four degrees of freedom are implemented using a multi-axis gimbal or multiple single-axis gimbals and pivots between adjacent track segments. The second degree of freedom is about a vertical axis allowing side-to-side rotational motion of the transceivers. The transceiver signals may thus be directed to one side or the other, and to points in between, for example, directly below the SAR sensor in altimetry operation. The third degree of freedom is about a horizontal axis parallel to a direction of travel of the SAR sensor with the track segments perpendicular to the direction of travel, thereby allowing the transceivers to form a horizontal line, a vertical line, or some intervening angle. This includes the case where the transceivers are at different angles, corresponding to the fourth degree of freedom, which permits simultaneous vertical and side-looking operations. The fifth degree of freedom is again about a horizontal axis parallel to the direction of travel, but with the segments also being parallel to the direction of travel. This permits pointing of the transceivers at a desired scene.

As the SAR sensor is capable of multiple imaging operations, the follow references provide additional details about these imaging operations. See, C. V. Jakowatz et al., "Spotlight-mode Synthetic Aperture Radar: A Signal Processing Approach," Springer (1996), for a discussion on SAR and interferometric SAR operations; D. C. Curtis, "MTI and Pulsed Doppler Radar with MATLAB (Second Edition)," Artech House (2010), for a discussion on moving target indication operation; and R. J. Sullivan, "Radar Foundations for Imaging and Advanced Concepts," SciTech (2004), for a discussion on monopulse operation; the contents of each of which are incorporated herein by reference.

In at least one embodiment of the invention, a synthetic aperture radar sensor comprises a plurality of segments, one or more pivots (each segment flexibly mechanically coupled to an adjacent segment by a corresponding pivot, each pivot changing a corresponding angle between corresponding adjacent segments), a plurality of antennas (each antenna moving along the plurality of segments, each antenna transmitting or receiving a corresponding radio frequency signal), and one or more gimbals (each gimbal rotating one or more antennas or one or more segments), the synthetic aperture radar sensor for high-gain synthetic aperture radar operation, altimetry operation, moving target indication operation, monopulse operation, high pulse repetition frequency operation, side-looking operation, vertical-looking operation, interferometric synthetic aperture radar operation, or terrain point cloud operation.

In various embodiments, the plurality of segments includes two segments, the one or more pivots includes one pivot, and the plurality of antennas includes two antennas; one of the one or more gimbals changing a corresponding angle between corresponding adjacent segments; the one or more gimbals includes a multi-axis gimbal; the at least one gimbal is located between a corresponding antenna and a corresponding segment; each antenna includes one or more phase centers; and the synthetic aperture radar sensor further comprises a plurality of optical imaging arrays (each antenna having a corresponding one of the plurality of optical imaging arrays, each optical imaging array sensing a corresponding optical image).

In at least one embodiment of the invention, a synthetic aperture sensor comprises a plurality of segments, one or more pivots (each segment flexibly mechanically coupled to an adjacent segment by a corresponding pivot, each pivot changing a corresponding angle between corresponding adjacent segments), a plurality of transceivers (each transceiver moving along the plurality of segments, each transceiver transmitting or receiving a corresponding signal), and one or more gimbals (each gimbal rotating one or more transceivers or one or more segments), the synthetic aperture sensor for high-gain synthetic aperture operation, altimetry operation, moving target indication operation, monopulse operation, high pulse repetition frequency operation, side-looking operation, vertical-looking operation, interferometric synthetic aperture operation, or terrain point cloud operation.

In various embodiments, the plurality of segments includes two segments, the one or more pivots includes one pivot, and the plurality of transceivers includes two transceivers; one of the one or more gimbals changing a corresponding angle between corresponding adjacent segments; each signal is a radar signal or a sonar signal; the one or more gimbals includes a multi-axis gimbal; at least one gimbal is located between a corresponding transceiver and a corresponding segment; each transceiver includes one or more phase centers; and the synthetic aperture sensor further comprises a plurality of optical imaging arrays (each transceiver having a corresponding one of the plurality of optical imaging arrays, each optical imaging array sensing a corresponding optical image).

In at least one embodiment of the invention, a synthetic aperture sensor comprises a segment, a plurality of transceivers (each transceiver moving along the segment, each transceiver transmitting or receiving a corresponding signal), and one or more gimbals (each gimbal rotating one or more transceivers or the segment), the synthetic aperture sensor for high-gain synthetic aperture operation, altimetry operation, moving target indication operation, monopulse operation, high pulse repetition frequency operation, side-looking operation, vertical-looking operation, interferometric synthetic aperture operation, or terrain point cloud operation.

In various embodiments, each signal is a radar signal or a sonar signal; at least one gimbal is located between a corresponding antenna and the segment; each transceiver includes one or more phase centers; and the synthetic aperture sensor further comprises a plurality of optical imaging arrays (each transceiver having a corresponding one of the plurality of optical imaging arrays, each optical imaging array sensing a corresponding optical image).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1:
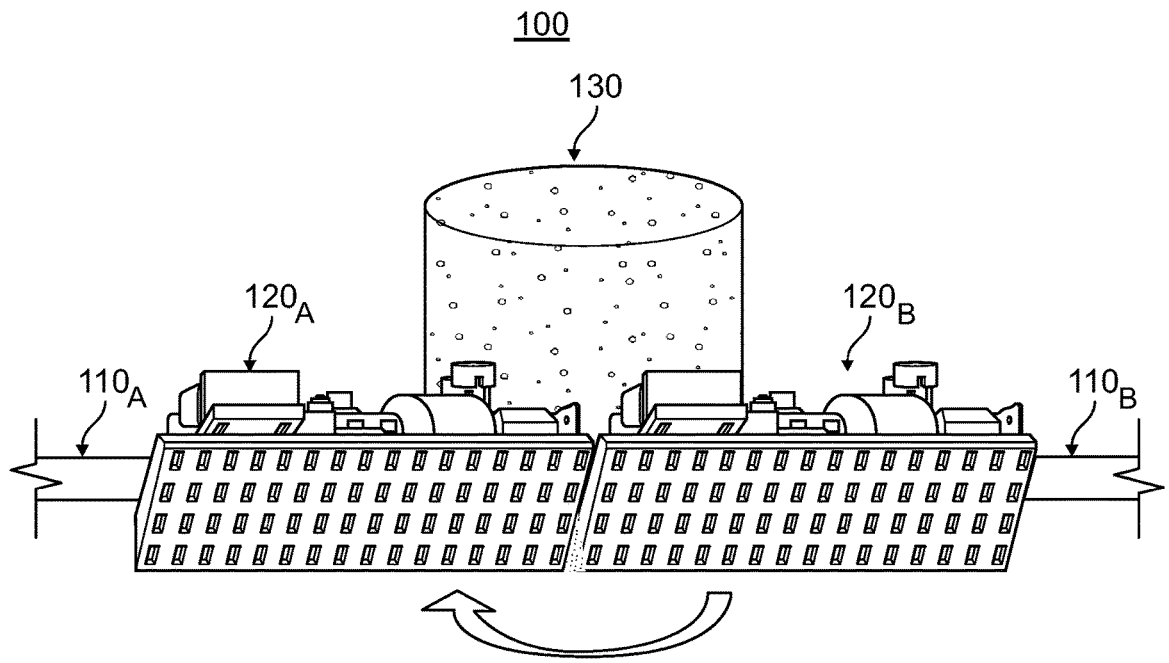
FIG. 1 illustrates a SAR sensor in accordance with one or more embodiments of the present invention.

At least one embodiment of the present invention employs a modular antenna array on a gimbaled track with pivoting capability, as illustrated in FIG. 1. In the embodiment illustrated in FIG. 1, the SAR sensor 100 includes a track with two segments 110$_A$, 110$_B$, to which two antennas 120$_A$, 120$_B$ are attached. As will be appreciated by one of ordinary skill in the art, each antenna 120$_A$, 120$_B$ may include one or more phase centers as part of an overall transceiver. A gimbal 130 mechanically coupled to the segments 110$_A$, 110$_B$ allows the segments 110$_A$, 110$_B$ to be rotated about a central vertical axis perpendicular to a longitudinal axis defined by the segments 110$_A$, 110$_B$. This vertical rotational axis defines a first axis for the gimbal 130. The gimbal 130 thus allows one to place the two antennas 120$_A$, 120$_B$ in either side-looking operation (the segments 110$_A$, 110$_B$ are parallel to the flight path, which, for example, is left to right in FIG. 1) or vertical operation (the segments $110_A$, $110_B$ are perpendicular to the flight path, which, for example, is into FIG. 1).

Figure 2:
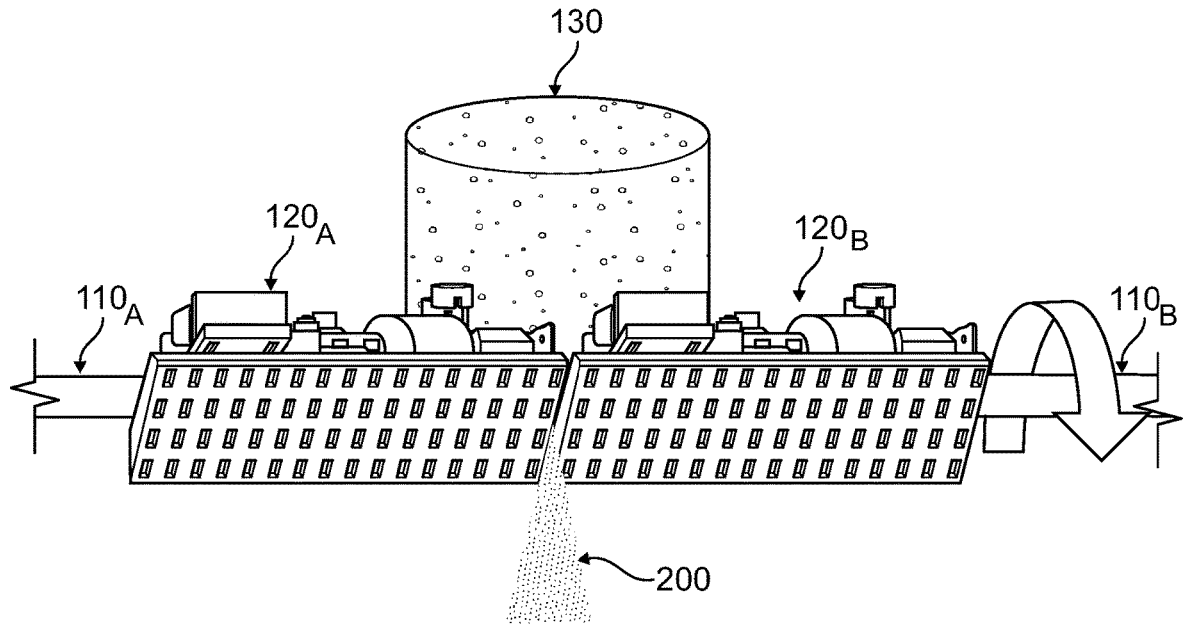
FIG. 2 illustrates a SAR sensor in accordance with one or more embodiments of the present invention operating in a first physical configuration.

As illustrated in FIG. 2, the gimbal 130 includes a second axis that allows the track segments $110_A$, $110_B$ to be rotated about the longitudinal axis defined by the segments $110_A$, $110_B$. This longitudinal rotational axis defines a second degree of freedom for the gimbal 130. As illustrated in FIG. 2, the segments $110_A$, $110_B$ are parallel to the flight path, which, for example, is left to right in FIG. 2. The gimbal 130 thus allows one to orient the antennas $120_A$, $120_B$ for side-looking operation, i.e., left, or right, or vertical operation. The specific angle of rotation will depend upon the altitude of the flight path and the desired scene. At low altitudes, the angle of rotation will likely be closer to 90°, i.e., horizontal. At higher altitudes or for scenes more directly under the SAR sensor 100, the angle of rotation may, for example, be between 10° and 45°. The rotation angle will be 0° during vertical operation. When the two antennas $120_A$, $120_B$ are joined together, the resultant extended length antenna permits high-gain SAR imaging or altimetry operation of the SAR sensor 100 with a single transmit/receive beam 200.

Figure 3:
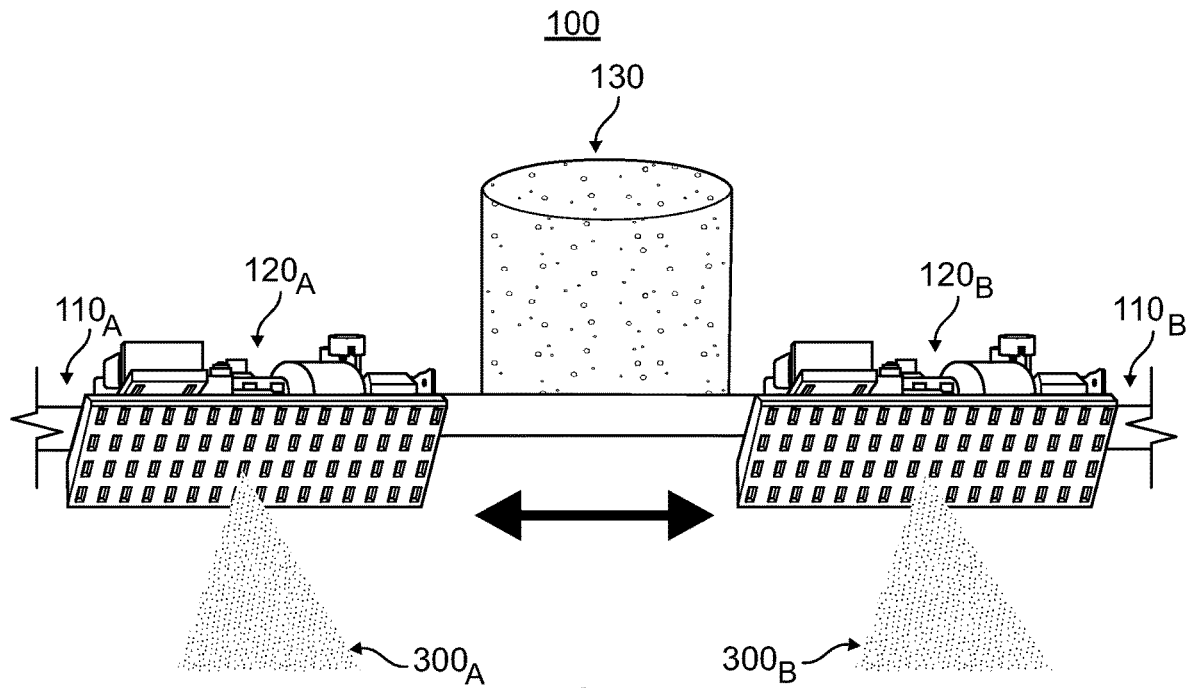
FIG. 3 illustrates a SAR sensor in accordance with one or more embodiments of the present invention operating in a second physical configuration.

As illustrated in FIG. 3, the two antennas $120_A$, $120_B$ can be separated from each other along the segments $110_A$, $110_B$. The two antennas $120_A$, $120_B$ may, for example, be separated using corresponding screw drives (not illustrated) embedded in the segments $110_A$, $110_B$, thereby allowing independent positioning of the antennas $120_A$, $120_B$ along their corresponding segments $110_A$, $110_B$. This separation of the antennas $120_A$, $120_B$ may alternatively be implemented using cogged segments $110_A$, $110_B$, with a motor-driven gear on the antennas $120_A$, $120_B$ engaging the cogged segments $110_A$, $110_B$. With the two antennas $120_A$, $120_B$ separated, and thus two separate transmit and/or receive beams 300A, 300B, multiple operations can be performed by the SAR sensor 100. A first operation provides moving target indication (MTI) functionality. A second operation employs a monopulse configuration in which a radar pulse is encoded to provide both range and direction information. A third operation employs a high PRF, with one of the antennas, for example, $120_A$, operating as a transmitter, with the other one of the antennas, for example, $120_B$, operating as a receiver. As will be appreciated by one of ordinary skill in the art, depending upon the operation, the segments $110_A$, $110_B$ will be either parallel or perpendicular to the flight path.

Figure 4:
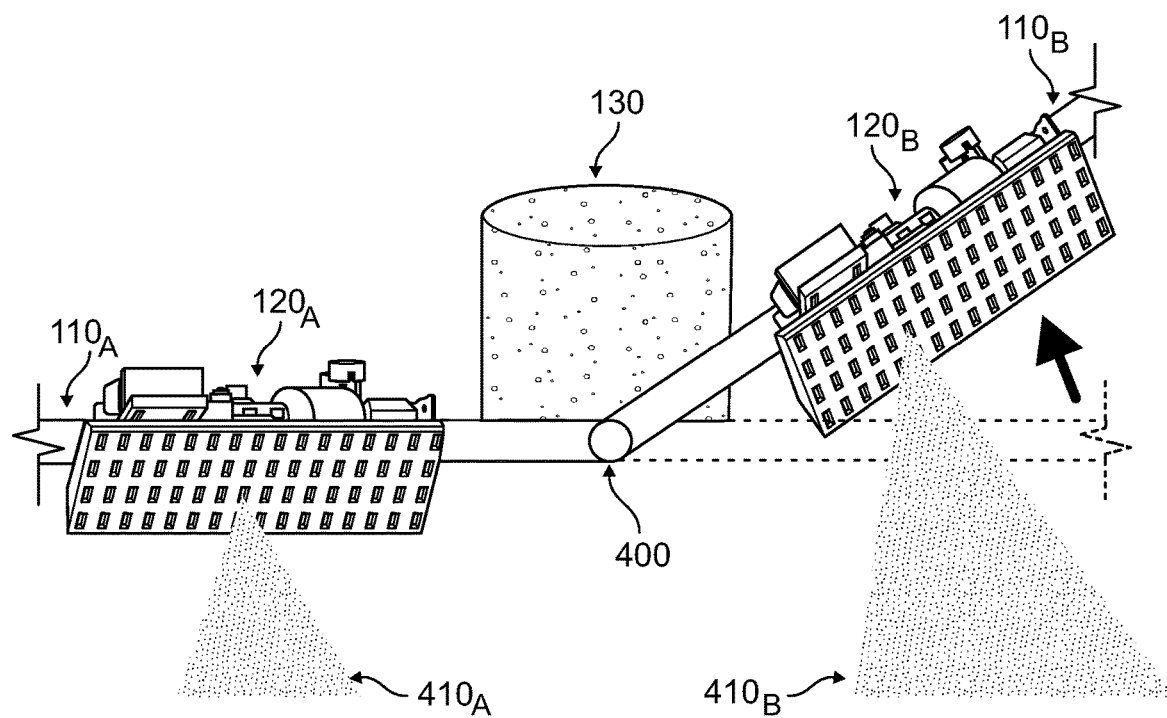
FIG. 4 illustrates a SAR sensor in accordance with one or more embodiments of the present invention operating in a third physical configuration.

As illustrated in FIG. 4, the two antennas $120_A$, $120_B$ can be separated, while an angle between the segments $110_A$, $110_B$ can be changed due to a pivot 400, i.e., the pivot 400 flexibly mechanically couples the segments $110_A$, $110_B$. The gimbal 130 drives the pivot 400 such that the angle between the two segments $110_A$, $110_B$ can be changed. This pivot axis defines a third degree of freedom for the gimbal 130. With the two antennas $120_A$, $120_B$ separated and the segments $110_A$, $110_B$ pivoted, the SAR sensor 100 can simultaneously perform both vertical and side-looking operations due to two separate transmit and/or receive beams 410A, 410B. During operation, the segments $110_A$, $110_B$ will be perpendicular to the flight path, with, for example, right-side-looking operation requiring a flight path into FIG. 4. Further, with the gimbal 130 having pivoted both segments $110_A$, $110_B$, for example, to equal angles, the SAR sensor 100 can simultaneously perform both right-side-looking and left-side-looking operations as the segments $110_A$, $110_B$ form a "V."

Figure 5:
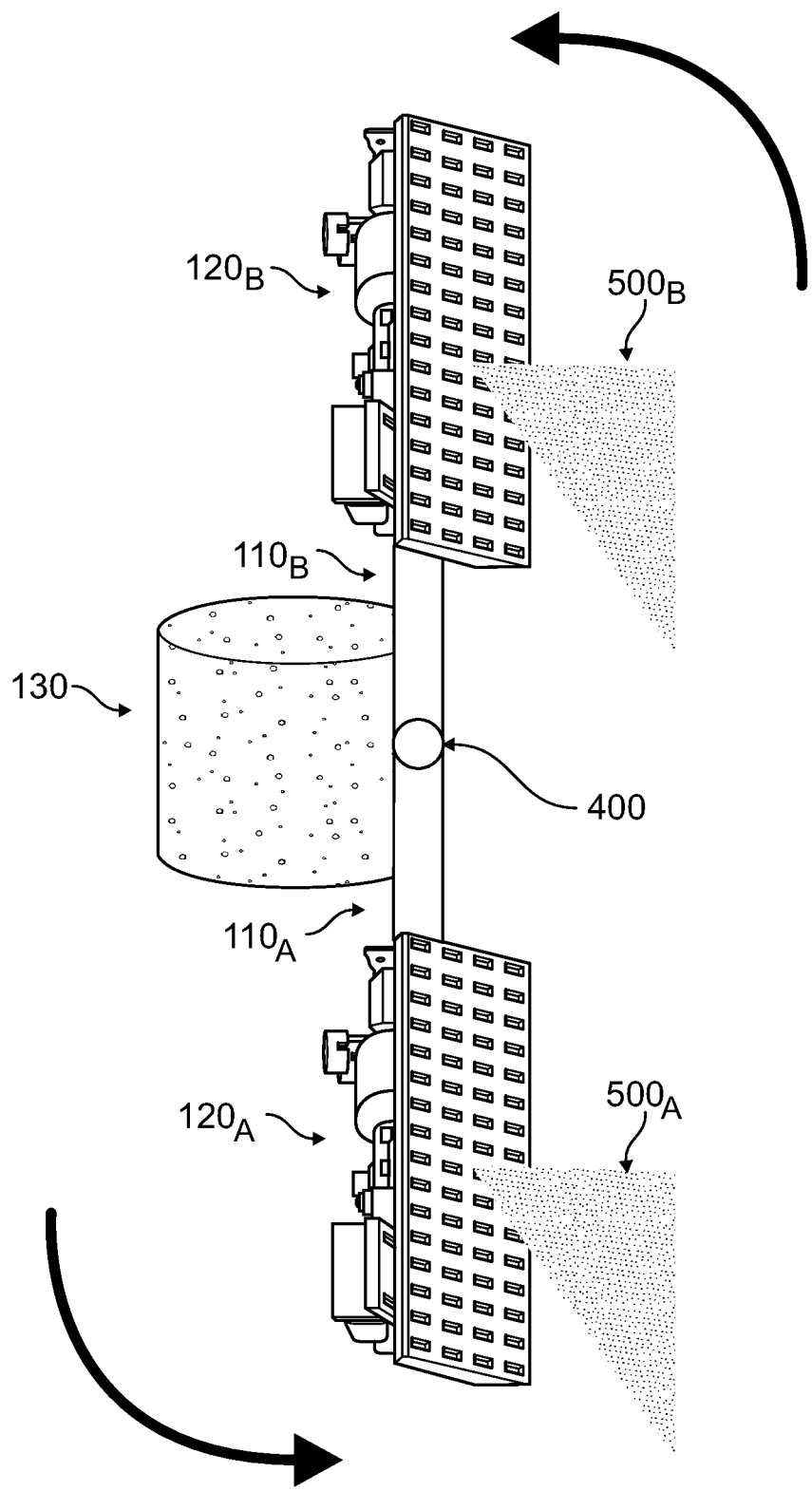
FIG. 5 illustrates a SAR sensor in accordance with one or more embodiments of the present invention operating in a fourth physical configuration.

As illustrated in FIG. 5, the two antennas $120_A$, $120_B$ can be separated, while the segments $110_A$, $110_B$ are pivoted into a vertical side-looking position, as opposed to the horizontal orientation illustrated in FIG. 3. FIG. 5 corresponds to the case illustrated in FIG. 4, but with the gimbal 130 having pivoted the segments $110_A$, $110_B$ to equal and opposite 90° angles, i.e., -90° and 90°, respectively. With the two antennas $120_A$, $120_B$ in this orientation, and thus two separate transmit and/or receive beams 500A, 500B, multiple operations can be performed by the SAR sensor 100. A first operation, with cross-track separation of the two antennas $120_A$, $120_B$, provides interferometric SAR functionality. A second operation, with the segments $110_A$, $110_B$ rotated by the gimbal 130, provides terrain point cloud functionality. While FIG. 5 illustrates the longitudinal axis defined by the segments $110_A$, $110_B$ being vertical, angles near this extreme would typically be employed for interferometric SAR only at low flight path altitudes. At higher flight path altitudes, the longitudinal axis defined by the segments $110_A$, $110_B$ would be changed such that the SAR sensor 100 would view the desired terrain. In this case, the angle of rotation of the longitudinal axis may, for example, result in an angular rotation of between -10° and -45° for segment $110_A$, and between 10° and 45° for segment $110_B$.

As described above with reference to FIGS. 2-5, various embodiments of the present invention overcome limitations of traditional SAR antenna configurations. Placing multiple antennas on multiple segments that are multi-axis gimbaled gives these embodiments additional degrees of freedom that have not previously been achieved.

The geometric relationship of the two antennas $120_A$, $120_B$, with respect to the vehicle heading, is an important factor in the resulting SAR information content. With proper geometric relationships, and suitable reference information, SAR information can be used to estimate navigational information regarding the vehicle.

As will be appreciated by one of ordinary skill in the art, various embodiments of the present invention may provide the benefits of both a multi-angle SAR sensor and a multiple phase center SAR sensor. These benefits may be provided individually, as illustrated in FIGS. 2, 3, and 5, or simultaneously, as illustrated in FIG. 4.

The SAR sensor illustrated in FIG. 1 includes two segments, though other embodiments of the present invention may employ three or more segments, with each pair of segments separated by a pivot. The SAR sensor illustrated in FIG. 1 includes two antennas, though other embodiments of the present invention may employ three or more antennas. The SAR sensor illustrated in FIG. 1 includes a multi-axis gimbal attached between two segments, though other embodiments of the present invention may locate a multi-axis gimbal between a segment and an antenna. In this embodiment, each antenna would have its own corresponding multi-axis gimbal, thereby allowing each antenna to be rotated independently. Further, with each antenna having its own corresponding multi-axis gimbal, the antennas may be independently pointed, thereby enabling spotlight operation and, if desired, dual spotlight operation as each antenna can be pointed at a different scene.

The SAR sensor illustrated in FIG. 1 includes two segments, though other embodiments of the present invention may employ only a single segment having a corresponding longitudinal segment axis. These embodiments include a gimbal allowing the single segment to be rotated about a vertical axis, similar to that illustrated and described above with reference to FIG. 1. The gimbal also allows the segment to be rotated about a longitudinal axis parallel to the longitudinal segment axis, for example, from side-looking operation to vertical operation, similar to that illustrated and described above with reference to FIG. 2. The gimbal further allows the segment to be rotated, for example, from a horizontal configuration (as illustrated and described above with reference to FIG. 3) to a vertical configuration (as illustrated and described above with reference to FIG. 5), i.e., about a horizontal rotation axis parallel to the flight path. As with the multiple segment embodiments, these single segment embodiments would employ two (or more) antennas, thereby enabling multiple imaging operations.

While the above described embodiments employed a single multi-axis gimbal to implement the desired rotations, other embodiments may employ multiple single-axis gimbals to implement the desired rotations.

One or more embodiments of the present invention may be employed in commercial applications, such as a redundant navigational aid on commercial airliners and helicopters. Further, due to the gimbal and pivoting capabilities of the multiple segments, the SAR sensor can be positioned for ranging to help with collision avoidance. The articulation provided by the gimbal and pivoting segments may be employed in boats equipped with sonar transceivers for synthetic aperture sonar and ranging. Given baseline sonar maps, these sonar systems may also be used for navigation purposes, much like the corresponding radar embodiments. In addition, one or more embodiments may find application in autonomous vehicles.

One or more embodiments may also include one or more optical imaging arrays, for example, each antenna would have a corresponding optical imaging array. By combining these different imaging modalities, i.e., radar and optical, one can further improve the overall imaging capability. As will be appreciated by one of ordinary skill in the art, performance of the one or more optical imaging arrays may suffer under various scenarios, including: poor lighting conditions, such as nighttime, if the optical imaging array operates at visible wavelengths, or blocking/scattering of the light when clouds or rain is present.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A synthetic aperture radar sensor system comprising:
a gimbal;
a plurality of segments defining a longitudinal axis, the plurality of segments mechanically coupled to the gimbal so the plurality of segments may be rotated about a central vertical axis perpendicular to the longitudinal axis and may be rotated about the longitudinal axis;
a plurality of antennas, each antenna coupled to a separate one of the plurality of segments and adapted to move along the longitudinal axis formed by the plurality of segments so the plurality of antennas may move relative to each other along the longitudinal axis, each antenna adapted to at least one of transmit or receive a corresponding radio frequency signal; and
wherein the synthetic aperture radar sensor is adapted for one or more of high-gain synthetic aperture radar operation, altimetry operation, moving target indication operation, monopulse operation, pulse repetition frequency operation, side-looking operation, vertical-looking operation, interferometric synthetic aperture radar operation, or terrain point cloud operation.

2. The synthetic aperture radar sensor system of claim 1, wherein the plurality of segments includes two segments; and
wherein the plurality of antennas includes two antennas, each coupled to one of the two segments.

3. The synthetic aperture radar sensor system of claim 1, wherein the plurality of segments consists of two segments.

4. The synthetic aperture radar sensor system of claim 3, wherein the plurality of antennas consists of two antennas, each coupled to one of the two segments.

5. The synthetic aperture radar sensor system of claim 4, wherein a pivot is located between the two segments that enables independent rotation of the two segments in the plane formed by the longitudinal axis between the two segments.

6. The synthetic aperture radar sensor system of claim 1, wherein each antenna includes one or more phase centers.

7. The synthetic aperture radar sensor system of claim 1 further comprising a plurality of optical imaging arrays, each antenna having a corresponding one of the plurality of optical imaging arrays, each optical imaging array adapted to sense a corresponding optical image.

8. The synthetic aperture radar sensor system of claim 4, wherein a pivot is located substantially equally between the two segments that enables independent rotation of the two segments in the plane formed by the longitudinal axis between the two segments.

9. The synthetic aperture sensor system of claim 4, wherein a pivot is located between the two segments that enables dependent rotation of the two segments in the plane formed by the longitudinal axis between the two segments.

10. The synthetic aperture sensor system of claim 4 wherein a pivot is located substantially equally between the two segments that enables dependent rotation of the two segments in the plane formed by the longitudinal axis between the two segments.

11. The synthetic aperture sensor system of claim 8, wherein each transceiver includes one or more phase centers.

12. The synthetic aperture sensor system of claim 10 further comprising a plurality of optical imaging arrays, each transceiver having a corresponding one of the plurality of optical imaging arrays, each optical imaging array adapted to sense a corresponding optical image.

* * * * *